July 22, 1952  G. B. BAILEY  2,604,116
PRESSURE SENSITIVE DEVICE
Filed Dec. 13, 1944  2 SHEETS—SHEET 1

INVENTOR.
GEORGE B. BAILEY.
BY Oltsch & Knoblock
ATTORNEYS.

July 22, 1952 G. B. BAILEY 2,604,116
PRESSURE SENSITIVE DEVICE
Filed Dec. 13, 1944 2 SHEETS—SHEET 2

GEORGE B. BAILEY.
INVENTOR.

BY Oltsch & Knoblock
ATTORNEYS.

Patented July 22, 1952

2,604,116

UNITED STATES PATENT OFFICE 2,604,116

PRESSURE SENSITIVE DEVICE

George B. Bailey, Long Beach, Ind., assignor to The Hays Corporation, Michigan City, Ind., a corporation of Indiana Application December 13, 1944, Serial No. 567,956

3 Claims. (Cl. 137—780)

This invention relates to a pressure sensitive device for use in a pressure measuring device. More particularly it relates to a pressure sensitive device of the slack diagram type.

It is frequently desirable to measure pressures which bear a particular relation to a given condition for the purpose of measuring that condition. For example, there is a square root relation between the difference in pressures at opposite sides of an orifice plate in a conduit and the rate of flow of a fluid in said conduit. Consequently, a measurement of the pressure difference will determine the rate of flow. In other instances, the relation may be that corresponding to a sine curve or the curve of any other mathematical function. Again, the relation may be represented by a simple curve other than that of a mathematical function. Heretofore, when an instrument has been made to measure such a condition, it has generally been necessary to construct it with mechanisms designed for the particular condition, which mechanisms are often quite complicated and expensive. Also, it is frequently necessary to take readings and then make corrective calculations to apply the readings to the particular condition being measured. In other words, calibration of the instrument for particular uses to enable direct readings to be taken, has frequently been impossible. Still another objectionable factor with prior instruments of this type has been that, in cases where calibration has been possible, the scale indications of the calibrated instrument have not been uniform and hence have been difficult to read.

The primary object of this invention is to provide an instrument having a novel pressure sensitive device which overcomes the difficulties and deficiencies mentioned above.

A further object is to provide a pressure sensitive device of the diaphragm type wherein the action or movement of the device matches a desired portion of a given simple curve.

A further object is to provide a pressure sensitive device of simple construction which can be calibrated to move in direct accordance with any condition whose variations can be plotted in a simple curve.

A further object is to provide a novel pressure sensitive device for use in an instrument for measuring a condition which can be plotted in a simple curve, and which accommodates the provision of scale indications which are substantially uniform.

A further object is to provide a novel pressure sensitive device for measuring the ratio between two given pressures.

A further object is to provide a pressure sensitive device for measuring the ratio between two pressures which utilizes a diaphragm as the measuring unit.

A further object is to provide a device responsive to the ratio between two pressures which is small in size, simple in construction, accurate, comparatively inexpensive and substantially free from trouble in operation.

A further object is to provide a novel device responsive to the ratio between two sets of differential pressures and usable in a measuring instrument to secure a direct reading of the ratio between two fluid flows or other condition measured from differential pressures.

Other objects will be apparent from the description, drawings and appended claims.

Figure 1:
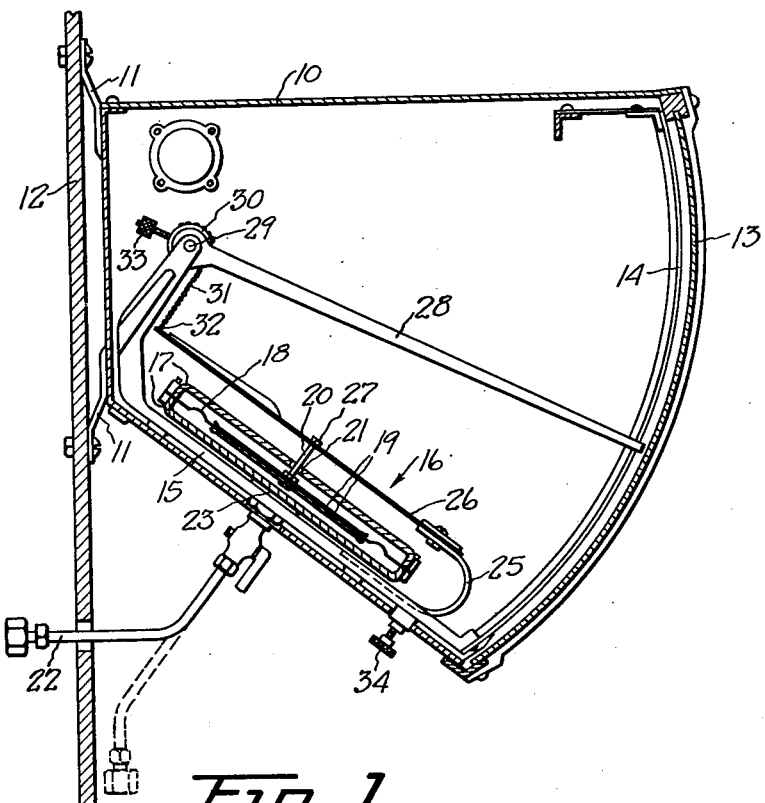
Fig. 1 is a vertical sectional view of one embodiment of the invention.
Figure 2:
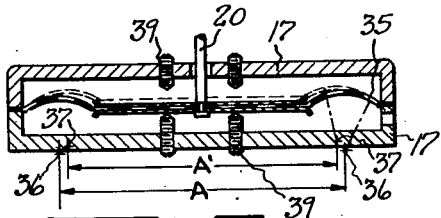
Fig. 2 is a transverse sectional view of the diaphragm unit of the invention.
Figure 3:
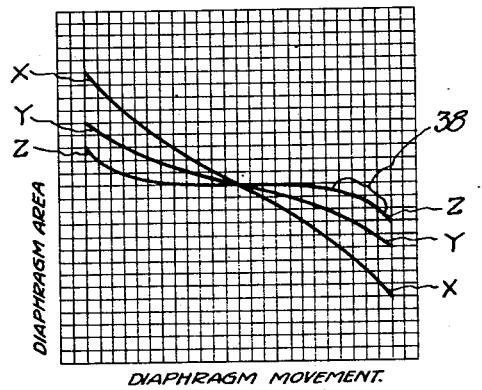
Fig. 3 is a diagrammatic view in which the actions of different characteristic devices are plotted.

Referring to the drawing, and particularly Figs. 1 to 3, which illustrate one embodiment of the invention, the numeral 10 designates an instrument housing mounted by brackets 11 upon a support 12, such as an instrument panel. The instrument housing has a transparent closure 13 through which a calibrated face plate 14 is visible. A frame 15, of substantially L-shape is mounted in housing 10 and supports a pressure sensitive device 16. As here illustrated, the device 16 comprises a two-part casing 17 defining a chamber spanned by a flexible diaphragm 18 clamped at its margin between the casing parts. Diaphragm 18 may be made of slack leather, gold beater's skin, plastic impregnated fabric, or any other flexible material substantially impervious to the passage of air therethrough. A pair of rigid plates 19 of a size smaller than the diaphragm are clamped or otherwise secured together on opposite sides of the diaphragm, and a rigid stem or stud 20 is carried by said plates at the center thereof and passes freely through an opening 21 in one of the casing sections. Consequently, one portion of the pressure sensitive device is subject to atmospheric pressure. A pressure line 22, to a source of pressure to be measured, which may be either above or below atmospheric pressure, is connected at 23 to casing 17 at the other portion of the pressure sensitive device.

Frame 15 may mount a U-shaped spring 25 extending around one end of casing 17, and an elongated flat spring 26 is secured to the free end of spring 25 and extends alongside of casing 17. Stud 20 is secured at its free end to an intermediate portion of the spring 26 at 27. A pointer arm 28 is pivoted to frame 15 at 29, with its free end extending adjacent to face plate 14 in indication relation thereto. A pulley 30 is fixedly secured to pointer 28, and a head chain 31 is secured thereto and passes therearound for connection to the free end of spring 26 at 32. A counterweight 33 may be mounted on the pointer 28. Suitable adjustment means 34 may be provided, such as means for adjusting the calibration or the zero reading of the instrument.

It will be apparent that any difference between the pressure introduced through line 22 and the atmospheric pressure introduced through casing opening 21 will cause the diaphragm 18 to be displaced from its position when said pressures are equal. This displacement is transmitted by stud 20, spring 26, head chain 31 and pulley 30 to the pointer 28.

One characteristic of the action or displacement of a diaphragm is that the relative areas of the central rigid plates 19 and of the total diaphragm area which determine the functional relation of diaphragm movement to effective area, changes incident to diaphragm displacement. In other words, for each position of the diaphragm in its range of displacement during operation, there is a difference in the functional relation between diaphragm movement and diaphragm area. This relation is illustrated diagrammatically in Fig. 3, where curves X, Y and Z illustrate the functional relations for different diaphragm type pressure sensitive units. The functional relation results from the change in the effective area of the diaphragm at different positions thereof. The effective diaphragm area is that bounded by lines of tangency to the maximum position of diaphragm displacement at its slack margin with respect to the plane of the diaphragm plates. For practical purposes, it may be considered that the slack marginal portion 35 of a diaphragm under tension will assume a true arcuate shape as illustrated in Fig. 2. Under such a condition, the axes 36 of said curved slack portions 35 of the complete diaphragm margin will bound an area designated A in Fig. 2, which is the effective diaphragm area when the diaphragm is in the full line position shown in Fig. 2. If the diaphragm then shifts to the dotted line position shown in Fig. 2, the axes of curvature of the diaphragm will shift inwardly as shown at 37 by reason of the stationary clamped position of the outer edge of said marginal portion between the two casing parts 17. Consequently, the effective diaphragm area is reduced as designated at A' in Fig. 2. For any given diaphragm unit, these factors will produce a characteristic curve similar to curves X, Y and Z of Fig. 2. The amount of slack in the diaphragm is another factor having a controlling influence on the character of the graph or curve as will be readily apparent, since it determines the radius of the curved form which the diaphragm margin 35 assumes under tension.

When an instrument is being constructed to measure a given condition, the characteristics of that condition are calculated and a graph or curve thereof is plotted. The pressure sensitive diaphragm unit is then so constructed that a portion of its functional curve, for example the portion 38 of curve Z of Fig. 2, will match the curve characteristic of the portion of the condition to be measured. For this purpose, master curves, such as shown in Fig. 3, may be prepared which plot the characteristics of pressure sensitive units of known properties, i. e., known dimensions of diaphragm and diaphragm plates and known degrees or amounts of slack. Thus, when the curve of the condition to be measured is compared with the master curves, it is possible to select a diaphragm unit which matches or approximates the function of the condition. If the master curves only approximate the desired curve, the required construction of the diaphragm unit can be determined quite accurately by interpolation with respect to two or more of the master curves which approximate the desired curve. The accuracy of the construction so determined by interpolation can then be tested and any necessary adjustments made therein until the required function thereof is secured.

Having thus matched the condition to be measured, the instrument, similar to Fig. 1, is constructed with the parts biased so that only the desired portion 38 of the movement of the device is utilized. One method of accomplishing this purpose is by providing adjustable stops 39 in the pressure sensitive unit, as shown in Fig. 2. These stops limit the range of movement of the diaphragm to that in the range of portion 38 of the curve. Other means may be utilized to accomplish the same result, another example being the use of springs, such as spring 25, so positioned and acting on the diaphragm unit through its stud 20 that the desired portion of diaphragm movement characterized by portion 38 of its characteristic curve is utilized, as where the forces acting on the diaphragm will not be adequate to deflect the springs outside of the range of movement selected. Accordingly, the completed instrument is simple, will give a direct reading of the condition being measured when it is properly calibrated, and will be easy to read because its scale graduations will be uniform. The curves which can be matched must be simple curves, but they may vary in a wide range. Simple arcuate curves, sine curves and curves of different mathematical functions are examples of curves which can be so matched.

Ratio measuring instruments constitute other embodiments of the invention. These instruments may be of the type illustrated in Figs. 4 and 5 wherein a three-part diaphragm casing comprising a base cup-shaped portion 40, a ring type intermediate portion 41 and a top cup-shaped portion 42 are employed. Diaphragm 43 is clamped marginally between casing parts 40 and 41, and diaphragm 44 is clamped marginally between casing parts 41 and 42. Diaphragm plates 45 of one selected size are clamped to the center of diaphragm 43, and diaphragm plates 46 of selected size, which may differ from the size of plates 45, are clamped to the center of diaphragm 44. Stud 47 is secured to and extends perpendicularly from the center of both sets of diaphragm plates 45, 46. A spacer 48 is preferably mounted on stud 47 and serves to maintain a predetermined spacing between said plates 45 and 46 at all times. A passage 49 in casing portion 40 communicates with the space defined by said casing portion and diaphragm 43. A passage 50 in casing portion 41 communicates with the space between the two diaphragms; and a passage 51 in casing part 42 communicates with the space defined by said casing part and diaphragm 44. Casing part 42 has a central projection 52 which may be formed separately and secured thereto or which may be integral therewith. The interior of projection 52 communicates with the space within casing part 42, and stud 47 projects therein. One wall of projection 52 has an opening which is spanned by a flexible diaphragm or seal 53 through which a lever 54 extends with a sealed fit. Lever 54 is pivoted to stud 47 at 55, and a bracket 56 carried by the projection 52 serves as a fulcrum and support for said lever to avoid application of stress to diaphragm 53.

Figure 4:
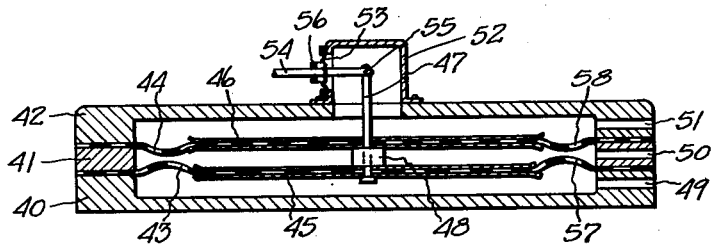
Fig. 4 is a sectional view illustrating a pressure sensitive device for use in a gage for measuring the ratio between two pressures greater than atmospheric pressure.

Fig. 4 illustrates a condition wherein the ratio between two pressures above atmosphere is to be measured. The respective sources of the subject pressures are connected at passages 49 and 51. Passage 50 is open to atmosphere. Inasmuch as the two diaphragms move as a unit in the casing, by virtue of their rigid spaced connection, a movement will result in a direction determined by the point of application of the higher of the two pressures whose ratio is measured. This movement is transmitted by stud 47 and lever 54 to any suitable indicating or recording means (not shown). Assuming that the pressure applied at passage 49 exceeds that applied at passage 51, the displacement of the diaphragms will be upward as viewed in Fig. 4. The slack marginal diaphragm portion 57 of diaphragm 43 will be curved inwardly as shown, and upward movement of plates 45 will tend to shift the centers or axes of curvature of diaphragm slack portion 57 inwardly. Consequently, the effective area of diaphragm 43 will decrease progressively incident to such displacement, similar to the change in area from A to A' shown in Fig. 2. At the same time, the lesser pressure applied at passage 51 will tension the margin 58 of diaphragm 44 inwardly, inasmuch as it is above atmosphere and acts against atmospheric pressure in the chamber between the diaphragms. However, as the plates 46 of diaphragm 44 are shifted upwardly because of the predominance in pressure below diaphragm 43, the centers or axes of curvature of marginal portions 58 of diaphragm 44 shift outwardly. Consequently, the effective area of the diaphragm 44 to which the lesser pressure is applied is increased progressively as the diaphragm is displaced or moved upwardly, similar to the change in area from A' to A shown in Fig. 2. The two diaphragms will reach a position at which the effect of the greater pressure on the diaphragm of reduced effective area will be balanced by the effect of the lesser pressure on the diaphragm of increased effective area. This balanced position is peculiar to the ratio of the applied pressures, and the position assumed by lever 54 and the related indicating or recording means gives a direct designation of that ratio when the instrument has been calibrated properly. In this connection it may be mentioned that the values of the applied pressures do not influence the instrument apart from their ratio. In other words, the reading of the instrument will be the same for any given ratio and regardless of the values of the pressures providing that ratio, i. e., a reading of ".5" will be obtained whether the applied pressures are .25# and .5#; or 1# and 2#; or 1.5# and 3#, and so forth.

Figure 5:
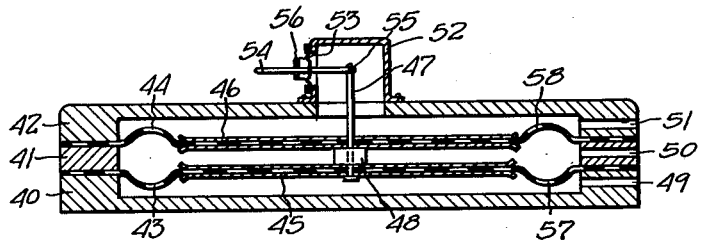
Fig. 5 is a sectional view of a pressure sensitive device for use in a gage for measuring the ratio between two pressures less than atmospheric pressure.

The Fig. 5 embodiment illustrates the application of the invention to measure the ratio between two pressures each less than atmospheric pressure. The subject pressures are applied at passages 49 and 51, and the passage 50 is open to atmosphere. Inasmuch as the atmospheric pressure exceeds the subject pressures, the diaphragm margins 57 and 58 will both be tensioned outwardly. The same action of balancing the position of the shiftable diaphragm unit by increasing and decreasing the areas of the two diaphragms incident to shifting of the diaphragm unit, as described above, occurs in this embodiment also.

Figure 6:
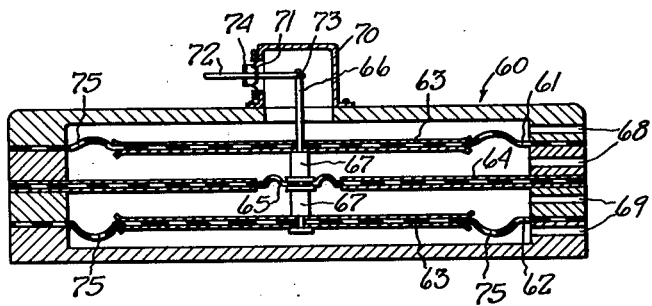
Fig. 6 is a sectional view illustrating a pressure sensitive device for a gage for measuring the ratio between two sets of differential pressures.

The Fig. 6 embodiment of the invention is also a ratio measuring instrument. This instrument has a casing 60 formed of a plurality of parts between which the margins of a pair of slack diaphragms 61 and 62 are clamped. Diaphragm plates 63 of sizes selected for the purpose of the instrument are clamped to the respective diaphragms. A central partition plate 64 spans the casing between the two diaphragms and has a restricted central opening spanned by a small slack diaphragm 65. Stud 66 is secured to and extends perpendicularly and centrally of each of the diaphragms. Spacers 67 preferably mounted on the stud serve to space the diaphragms 61 and 62 predetermined distances from central diaphragm 65. One set of differential pressures is applied at opposite sides of diaphragm 61 at passages 68 which communicate with the spaces at opposite sides of said diaphragm, and a second set of differential pressures is applied at opposite sides of diaphragm 62 at casing passages 69. Projection 70 at the center of one face of the casing communicates with the chamber of said casing which is adjacent thereto, and stud 66 extends therein.

An opening in one side of projection 70 is spanned by diaphragm 71 through which a lever 72 extends with a sealed fit. Lever 72 is pivoted at 73 to stud 66 and is fulcrumed in a bracket 74 carried by projection 70.

In the arrangement illustrated in Fig. 6, the greater pressure of each of the two sets of differential pressures is applied at the innermost chambers, so that the slack margins 75 of the two diaphragms 61, 62 are tensioned outwardly. The center diaphragm 65 will be tensioned according to the location or point of application of the predominant major pressure of the two sets of differential pressures. The diaphragm unit 61, 62, 65 will shift according to the ratio between the differences in the two sets of applied pressures, and a balance of the diaphragm unit will be reached in the same manner and for the same reasons mentioned above. Inasmuch as the flow of a fluid is commonly measured by measuring the difference between the pressures at opposite sides of an orifice plate in the path of flow, it will be apparent that the device will serve to give a direct reading of the ratio between the flow of two fluids.

Each of the devices illustrated in Figs. 4, 5 and 6 operates on the principle that the ratio between two pressures is the reciprocal of the areas of the diaphragms against which they act.

Such ratio measurement, by the use of diaphragms, to obtain a direct reading of the ratio is believed to be distinctly novel. Also, attention is directed to the fact that each of the different embodiments requires only a shallow housing. Consequently, the devices can be made in small sizes. The simplicity of the device, resulting from the arrangement of the diaphragms to balance themselves automatically at a position peculiar to the ratio of the applied pressures, is also important with respect to the cost of the device, freedom from operating failures and other characteristics. Another important characteristic of each embodiment of ratio measuring device illustrated is that all applied forces are taken directly by the diaphragm assembly or unit in each case because of the rigid connection between the constituent diaphragms. This relieves the bearings and other mechanical moving parts of the forces applied and simplifies their construction and design, so that the possibility of the occurrence of errors for mechanical reasons is overcome and avoided.

I claim:

1. In a ratio gage, a three-part casing, a slack diaphragm marginally clamped by said casing parts at each parting plane, a rigid center plate secured to each diaphragm, means connecting said plates in predetermined spaced relation, and means for applying the pressures whose ratio is to be measured at the outer casing parts, one of said outer casing parts having a chambered projection open at one side thereof, a flexible seal spanning said opening, a lever passing through said seal, means fulcruming said lever adjacent said seal, and a stud carried by said diaphragms and pivotally connected to said lever.

2. In a pressure ratio gage, a casing having a pair of spaced pressure chambers defined in part by a pair of spaced diaphragms having rigid center portions and slack marginal portions, said diaphragms being fixedly connected in spaced relation at said center portions to define a shiftable unit whose respective effective diaphragm areas vary progressively with shifting thereof in a manner to reduce the effective area of the diaphragm subjected to the higher pressure at a predetermined rate and increase the effective area of the other diaphragm at a second predetermined rate until the reactions of the two pressures on the respective diaphragms are in balance.

3. In a pressure measuring device, a pressure sensitive unit comprising a closed casing, a pair of diaphragms secured at their peripheries to and spanning said casing to form with the ends of said casing a pair of outer chambers and cooperating with each other to form an intermediate chamber, each of said diaphragms including a rigid central portion and a slack marginal portion, and means rigidly connecting the central portions of said diaphragms in predetermined spaced relation for movement thereof as a unit, the ends of said casing being provided with pressure connections communicating, respectively, with the outer chambers for the application of pressure to the outer faces of the diaphragms, and the intermediate portion of the casing having a connection communicating with the intermediate chamber for subjecting the inner faces of the diaphragms to a common pressure whereby when both of the pressures applied to the outer chambers exceed or are less than the pressure applied to the intermediate chamber the diaphragms will be bowed in opposite directions, the sizes of said rigid central portions being so designed that the effective areas of said diaphragms progressively vary upon movement of the diaphragms as a unit by a differential in pressure applied to the outer chambers and so that movement of the unit is terminated when the ratio of the effective areas of the diaphragms equal the reciprocal of the ratio of the applied pressures.

GEORGE B. BAILEY.

REFERENCES CITED

The following references are of record in the file of this patent:

UNITED STATES PATENTS

| Number | Name | Date |
|---|---|---|
| Re. 19,902 | Sprague et al. | Mar. 24, 1936 |
| 1,183,486 | Pardue | May 16, 1916 |
| 1,371,243 | Hopwood | Mar. 15, 1921 |
| 1,473,173 | Brinkerhoff | Nov. 6, 1923 |
| 1,841,651 | Sprague | Jan. 19, 1932 |
| 1,893,200 | Dolbey | Jan. 3, 1933 |
| 1,937,314 | Bryant | Nov. 28, 1933 |
| 2,090,160 | Spitzglass et al. | Aug. 17, 1937 |
| 2,298,168 | Robinson | Oct. 6, 1942 |
| 2,339,847 | Ellison | Jan. 25, 1944 |
| 2,340,395 | Lindemann | Feb. 1, 1944 |